UNITED STATES PATENT OFFICE.

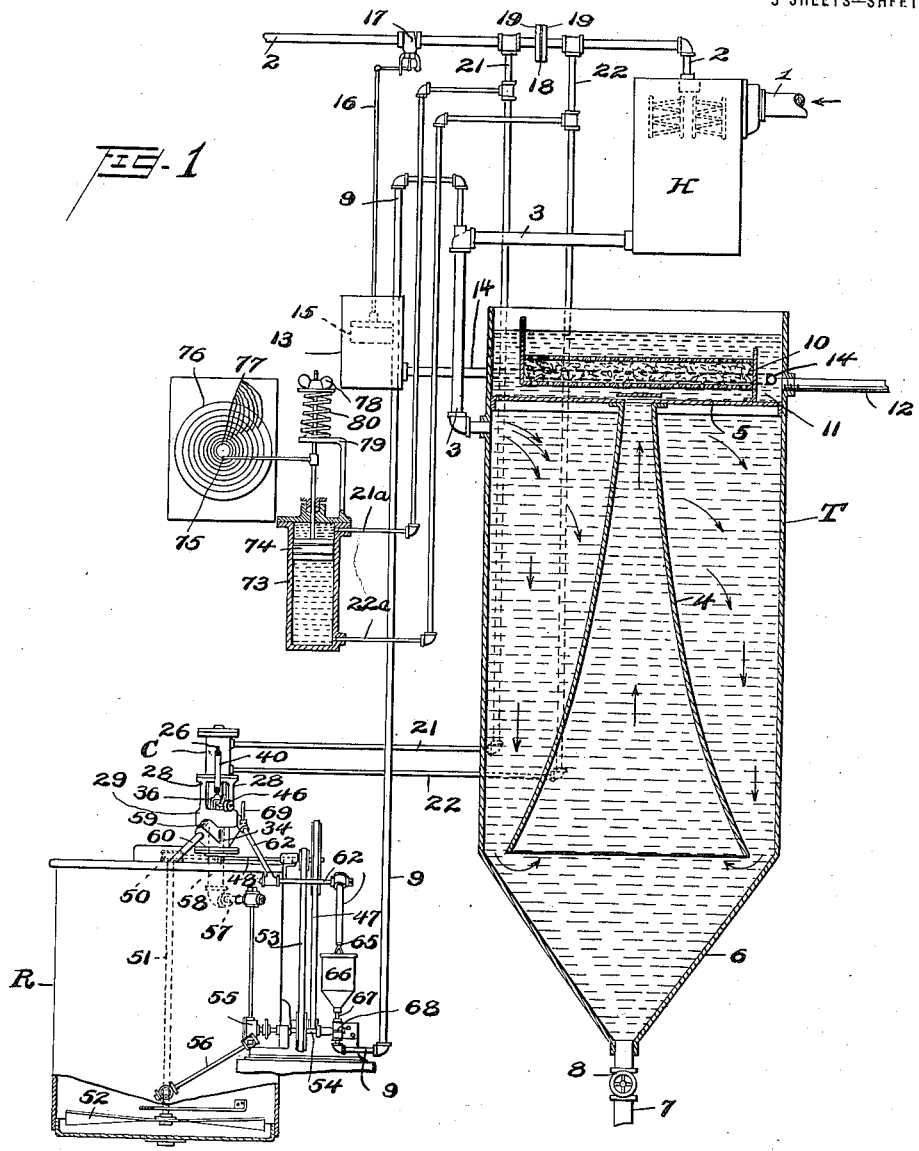

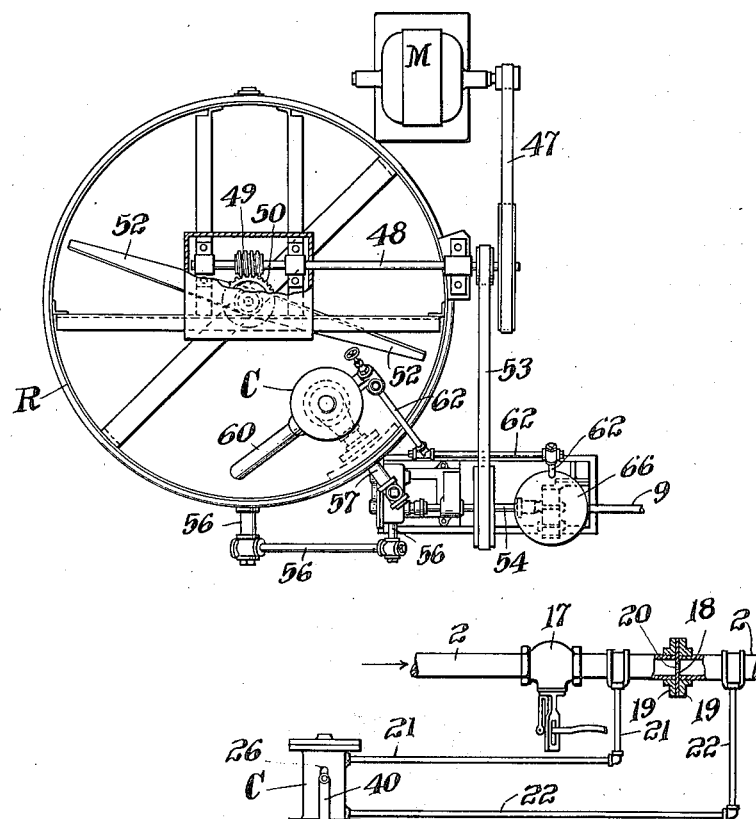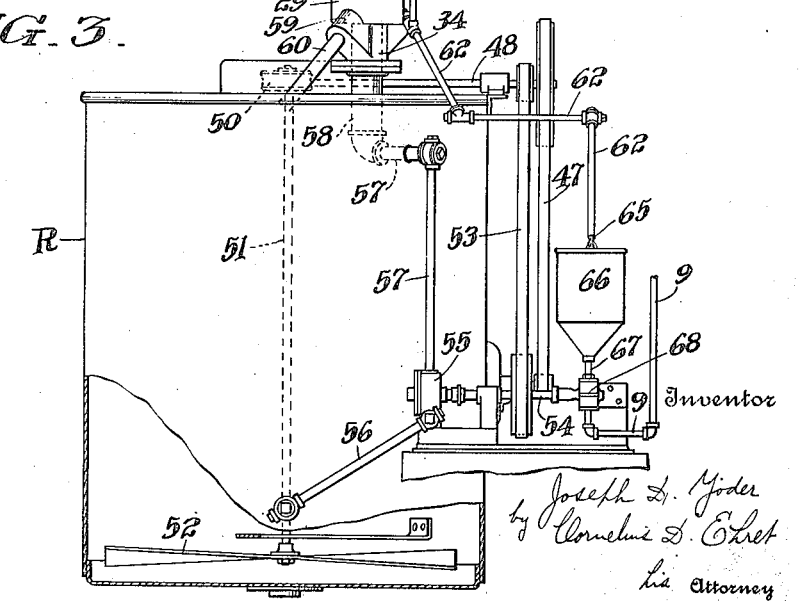

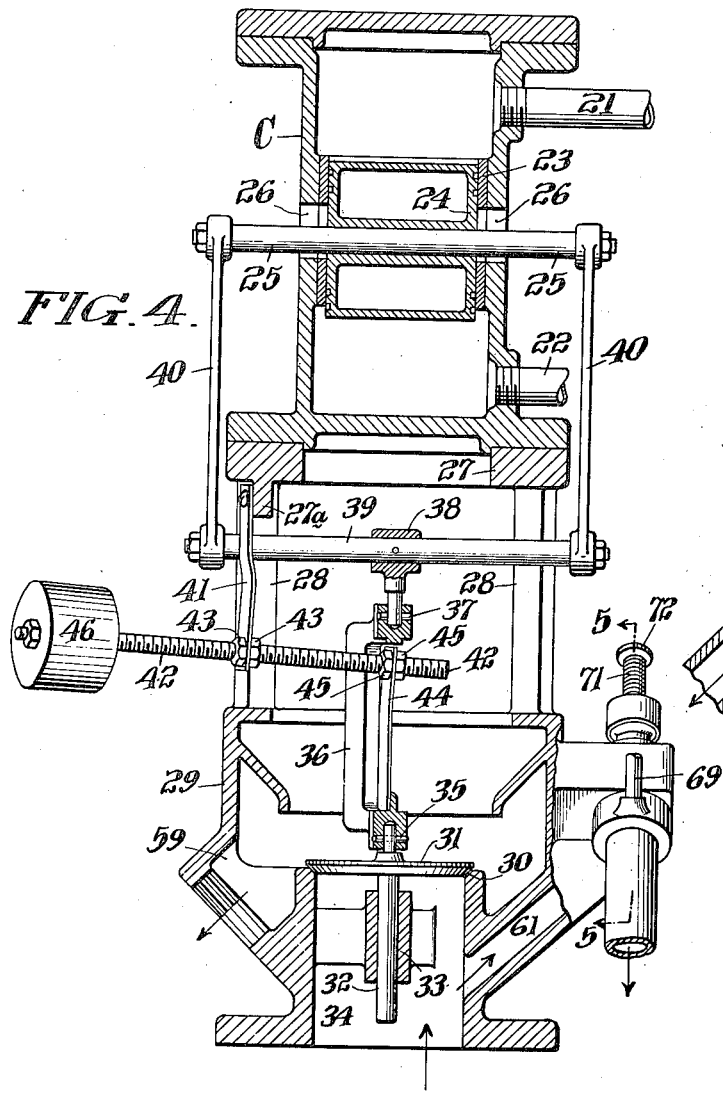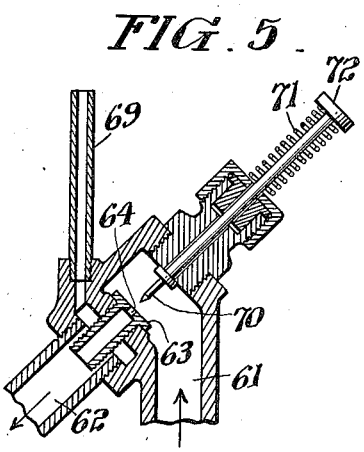

JOSEPH D. YODER, OF PHILADELPHIA, PENNSYLVANIA, ASSIGNOR TO HARRISON SAFETY BOILER WORKS, OF PHILADELPHIA, PENNSYLVANIA, A FIRM COMPOSED OF JOSEPH S. LOVERING WHARTON, WILLIAM S. HALLOWELL, AND JOHN C. JONES.

AUTOMATIC FLUID-PROPORTIONING APPARATUS.

1,262,730.     Specification of Letters Patent.    Patented Apr. 16, 1918.

Application filed March 25, 1916. Serial No. 86,688.

*To all whom it may concern:*

Be it known that I, JOSEPH D. YODER, a citizen of the United States, residing in the city of Philadelphia, county of Philadelphia, and State of Pennsylvania, have invented a new and useful Automatic Fluid-Proportioning Apparatus, of which the following is a specification.

My invention relates to a system of or apparatus for automatically proportioning the quantity of one fluid with respect to the quantity of another fluid, as, for example, the proportioning of a chemical containing liquid with respect to another liquid having content with which the chemical is to react.

My invention resides in such a system or apparatus wherein the proportioning is effected by varying the head of or pressure upon one fluid determining the quantity of that fluid in accordance with a varying head or pressure resulting from variations in quantity of the other fluid.

More particularly my invention resides in such a system wherein a flow restricting or determining device is subjected to a head or pressure of one fluid which varies proportionately with the difference in heads or pressures on opposite sides of a flow restricting or determining device through which the other fluid passes.

More particularly my invention resides in such a system wherein one fluid is maintained in constant motion or circulation and a pressure created thereby is opposed or counterbalanced by a pressure or difference in pressures of another fluid, the quantity of the first fluid delivered through a branch or by-pass depending upon the pressure or difference of pressures of the second named fluid.

My invention resides in the system or apparatus of the character hereinafter described and claimed.

For an illustration of one of the forms my invention may take, reference is to be had to the accompanying drawings, in which:

Figure 1 is a view, partly in section, illustrating one application of my invention.

Fig. 2 is a top plan view of part of the apparatus shown in Fig. 1.

Fig. 3 is a side elevational view of apparatus shown in Fig. 2, together with additional apparatus.

Fig. 4 is a vertical sectional view, some parts in elevation, of the automatic fluid proportioning apparatus.

Fig. 5 is a sectional view taken on the line 5—5 of Fig. 4.

Referring to Fig. 1, for an example of an application of my invention, H represents a heater for the feed water of a steam boiler, the same receiving exhaust steam through the connection 1 and through the pipe 2 raw water which is to be heated within the heater H and is delivered through the pipe 3 into the treating tank T wherein the raw water is to be chemically treated because of any content therein which would be injurious to the boiler or cause incrustation therein and reduce its operating efficiency.

The treating tank T contains the shell 4 opening at its top through the horizontal partition 5 and open at its bottom to allow ingress of water from the heater H delivered by the pipe 3, the water taking the course through the tank T indicated by the arrows, the chemical reaction taking place largely during the time from the entry of the water through the pipe 3 to its entry into the lower end of the member 4, any precipitate or sediment settling out in the conical bottom 6 of the tank T, the precipitate or sediment being drawn off through the pipe 7 controlled by valve 8. The chemical is introduced in water or liquid delivered through the pipe 9 into the pipe 3 or directly into the tank T below the partition 5. The treated water rises through the member 4 into the container 10 and overflows its edges into the space 11 above the partition 5 and is drawn off through pipe 12 by a feed pump, not shown, which delivers it to the boiler as the feed water thereof.

A float box 13 is connected by pipe 14 with the space 11, whereby the level of water in the float box 13 is maintained the same as that in the space 11, whereby, as the level in the compartment 11 falls, due to delivery of feed water through the pipe 12 to the boiler, the float 15 will correspondingly descend, and through the connecting rod 16 actuate the valve 17 in pipe 2 to open the same and cause or allow greater delivery of water through the pipe 2 into the heater H to correspond with the demand for boiler feed water.

While such is an application of my invention, it will be understood that it is applicable to other relations and other fluids or liquids for various purposes, the desired result being the delivery or measurement of one fluid proportionately to the quantity of another, and, specifically, in the example illustrated, the delivery through the pipe 9 of an amount of chemical carrying liquid proportional to the amount of water delivered through the pipe 2.

To these ends, I provide in the pipe 2, Figs. 1 and 3, a plate 18 secured between the flanges 19, 19 and having the orifice 20 through which the water delivered through the pipe 2 shall pass. The orifice 20 is sufficiently restricted in order to cause or require an appreciable effective pressure or head for the delivery therethrough of the desired or required amount of raw water. The raw water, after passing the orifice 20, has to overcome some friction within the pipe 2 and in some cases, though not so illustrated in Fig. 1, may have to be lifted vertically some distance, and may have to overcome a certain amount of back pressure in the heater H, with the result that the pressure or head in the pipe 2 immediately after passage through the orifice 20 is an appreciable pressure or head when water is flowing through the pipe 2; and consequently on the opposite side of the orifice 20, that is, the approach side of the orifice 20, the pressure or head exceeds that on the opposite or discharge side of the orifice 20 by an amount which is sufficient to force the quantity of water required through the orifice 20. It is seen therefore that when water is delivered through the orifice 20 there is a difference in pressure on opposite sides thereof and this is the effective pressure causing flow of the required quantities of water through the orifice. Communicating with the interior of pipe 2 on the approach side (left side, Fig. 3) is a pipe 21, Figs. 3 and 4, which communicates with the upper end of the cylinder C with whose lower end communicates the pipe 22 communicating with the interior of the pipe 2 on the discharge side of the orifice 20. Within the cylinder C, Fig. 4, is the cylindrical liner 23 within which is adapted to reciprocate the piston 24 to which is secured the rod 25 extending through apertures 26 in opposite sides of the cylinder C which is secured upon the member 27 at the upper ends of the legs 28 formed upon the hollow base member 29. In the base member 29 is the seat 30 for the valve 31 whose stem 32 is guided in the bearing 33, the valve seat 30 being at the upper end of the passage 34. The valve 31 is connected by pin 35 to the lower end of the yoke 36 whose upper end is connected by pin 37 to the member 38 which is attached to the bar or rod 39 which in turn is connected by the links or bars 40 with the rod or bar 25 on the piston 24. Attached to the lug 27ª on the member 27 is the metal strap or spring 41 through whose lower end extends the rod 42 having threaded thereon the nuts 43 between which member 41 is held. The rod 42 near its inner end passes through the metallic strap or spring 44 which is secured at its lower end to the lower end of the yoke 36 and whose upper end is free and held between the nuts 45 screw threaded on the rod 42. Screw threaded on the outer end of the rod 42 is the counterweight 46. By suitably adjusting the position of the rod 42 with respect to the members 41 and 44, and by suitably adjusting the weight 46 longitudinally of the bar 42, the weight 46 counterbalances the weight of the valve 31, yoke 36, piston 24 and all the attached parts which move in unison.

Referring now more particularly to Figs. 2 and 3, R is a reagent or chemical tank in which is contained water or other liquid in which there is in solution or suspension, or both, a chemical of the nature required to react with the contents of the raw water, the reaction taking place, as previously stated, in the tank T.

M is an electric or other suitable motor which through belt 47 drives the shaft 48 having thereon the worm 49 which in turn drives the worm gear 50 and through the latter the shaft 51 carrying at its lower end the paddle 52 within the tank R to mix the chemical with the water or other liquid or to agitate the same to keep the same in suitable suspension therein, as when milk of lime is employed as the reagent. On the shaft 48 is a pulley which through belt 53 drives the shaft 54 which drives the rotary displacement pump 55 or a centrifugal or other suitable type of pump, to whose suction is connected the pipe 56 through which chemical containing water or liquid is drawn from near the bottom of the tank R and delivered by the pump 55 by the pipe 57 to the chamber 58 communicating with the passage 34, Fig. 4. The liquid passes upwardly through passage 34 through the valve 31 and thence through the pipe 60 and back into the tank R, whereby the pump 55 maintains at substantially constant rate a circulation of the chemical bearing liquid from and back to the tank R.

Referring again to Figs. 4 and 5, there communicates with the passage 34 the bypass passage 61 between which and the outlet passage or pipe 62 is disposed the ferrule 63 having the orifice 64 through which the chemical bearing liquid passes, under conditions hereinafter described, through the pipe 62, which delivers the chemical bearing liquid at 65 into the funnel or receptacle 66 which is open to the atmosphere. From the bottom of the funnel 66 is a fluid connection 67 to the pump 68, driven by shaft 54, which delivers the chemical bearing liquid to the pipe 9 through which it is delivered into the pipe 3, Fig. 1, into the raw water which passes into the reaction tank T as previously described.

In that form of my apparatus illustrated in Fig. 4, the diameter of the valve 31 is equal to the diameter of the valve 24; it will be understood, however, that my invention is not limited to this equality of diameters and that the piston and valve may be of different diameters.

Through the pipe 21 the upper end of the cylinder C is filled with water at a pressure equal to or corresponding with the pressure on the approach side of the orifice 20 and the lower end of the cylinder C is filled with water through pipe 22 at a pressure equal to or corresponding with the pressure on the discharge side of the orifice 20. Consequently piston 24, whenever water is flowing through the passage 20, has a greater pressure exerted on its upper end than upon its lower, and is therefore subject to an effective pressure which is the difference or corresponds with the difference between the pressures on opposite sides of the orifice 20. When water is flowing through orifice 20 the piston 24 exerts a downward pressure which is transmitted through the rod 25, bars 40, bar 39, yoke 36, to the valve 31, which latter, however, has exerted thereon an upward pressure due to the flow upwardly through the passage 34 of chemical bearing liquid delivered by the pump 55. The pump 55 maintains a substantially constant rate of flow of chemical liquid and, accordingly, the valve 31 will take that position in which the force exerted by the piston 24 will be balanced by the force exerted upwardly by the valve 31, which force is equal to the area of the valve 31 multiplied by the pressure per unit area exerted on its under side by the chemical bearing liquid; and this pressure on the under side of the valve 31 varies equally with the force exerted by piston 24, and when piston 24 and valve 31 are of equal areas the pressure on the under side of the valve 31 will always be equal to the difference in pressures on the upper and lower sides of piston 24 and therefore to the difference in pressure between opposite sides of the orifice 20.

There being then in the passage 34 a pressure equal or proportional to the difference in pressures on opposite sides of the orifice 20 there will be exerted on chemical orifice 64 a pressure substantially that in the passage 34, with the result that there will be a flow of chemical bearing liquid through orifice 64 whose amount will depend upon the difference in pressure on opposite sides of orifice 20, and consequently the flow of liquid through orifice 64 will always be directly proportional to the amount of liquid flowing through orifice 20. The effective pressures upon both the raw water orifice 20 and the chemical orifice 64 are at all times equal, when the valve 31 and piston 24 have equal areas, and the amount of chemical bearing liquid delivered through pipes 62 and 9 is always strictly proportional to the amount of raw water passing into the orifice 20. The effective pressure upon the orifice 20 causes the prompt or instant building up of an equal effective pressure upon the chemical orifice 64.

When the valve 31 and piston 24 have different areas, as above intimated, the pressure in the passage 34, and therefore the pressure exerted upon the chemical orifice 64, will not be equal to the effective pressure exerted upon the raw water orifice 20, but will nevertheless be strictly proportional thereto and therefore, again, the quantity of liquid delivered through orifice 64 will remain strictly proportional to that delivered through orifice 20.

The valve 31 always occupies a position above its seat 30, because there is a constant circulation of chemical bearing liquid, and its position at any time is such that the pressure on its under side, determined by the differential pressure of the orifice 20, will cause delivery of the chemical bearing liquid through the chemical orifice at a rate proportional to the rate of flow in pipe 2.

The chemical orifice 64 is preferably located at a point slightly higher than the valve seat 30 and at the highest point in the by-pass system which delivers the measured chemical bearing liquid. With the location of the orifice 64 above the valve seat 30 it will require a slight pressure or head in the by-pass passage 61 to lift the chemical bearing liquid to the orifice 64. Accordingly, when there is no flow of water through the orifice 20 no liquid will pass through the orifice 64, notwithstanding the continued circulation of liquid from and back to the tank R through the passage 34. To these ends the counter-balancing weight 46 may be made slightly lighter than the weight of the moving parts comprising valve 31 and piston 24 and their connecting parts, with the result that when there is no flow through the orifice 20, and therefore no downward force exerted by the piston 24, the valve 31 will slightly throttle the circulating chemical solution and build up a head or pressure in the by-pass 61 sufficient to lift the liquid to the height of orifice 64, but will force no liquid through it.

According to the described example of embodiment of my invention, therefore, there is maintained a flow of chemical bearing liquid at substantially constant rate, with an orifice or flow restricting device in a by-pass from the chemical circulating system, an orifice or flow restricting device in the raw water pipe, and a valve operated upon by a pressure exerted by the circulating chemical bearing liquid which balances the varying differential pressure due to the orifice in the raw water pipe, with the result that the head or pressure upon the chemical orifice is such that with all variations of flow of raw water through the raw water orifice there is a proportional delivery of chemical bearing liquid through the chemical orifice.

In order that the flow of chemical in the orifice 64 may depend entirely upon the pressure in the by-pass 61 determined by position of valve 31, and shall not be affected by the suction head represented by the distance of the discharge 65 below the orifice 64, the vent pipe 69, open to the atmosphere, communicates with the space immediately beneath the orifice 64, Fig. 5.

And for cleaning the orifice 64 there is provided the needle-like plunger 70 normally retracted by the spring 71, a thrust upon the head 72 of the plunger 70 driving the same forward into the orifice 64 to clean the same, the spring 71 retracting the plunger to normal position indicated in Fig. 5.

Whatever variation may occur in the pressure on the discharge side of the orifice 20, due for example to varying back pressure in the heater H, the flow of water through the orifice 20 will be dependent upon the difference in pressure on opposite sides thereof, and it is this condition of pressure which determines the quantity of chemical bearing liquid passing through the orifice 64. In consequence whatever may be the absolute pressures on opposite sides of the piston 24, due to varying conditions in the system, the quantity of liquid passing orifice 64 is dependent only upon the difference in these pressures.

The chemical orifice 64 is not open to the atmosphere and therefore, when milk of lime is the reagent employed, there will be no scaling or deposit formed upon the orifice.

To suit different conditions of operation of the entire system, or, more particularly, to suit widely different quantities of flow of raw water through orifice 20, the orifice 64 may be given different sizes, and the size of the orifice 64 will also be different, other things being equal, when the area of valve 31 is different from that of piston 24.

Referring against to Fig. 1, a cylinder 73 has therein the movable piston 74 on opposite sides of which are the pipes 21ª and 22ª communicating respectively with pipes 21 and 22 and therefore communicating with the pipe 2 on opposite sides of the orificed plate 18, whereby the piston 74 will be subjected to the difference between the pressures on opposite sides of the orifice 20. To the piston rod is directly or indirectly connected an indicator or recording marker 75 which is adapted to move across the paper chart 76 having the logarithmic graduations 77. Between the nut 78, on the piston rod and the bracket 79 is a spring 80.

The piston 74 will be acted upon by the difference in pressures on opposite sides of the orifice 20 and will, as the rate of flow through the orifice 20 increases, descend and compress the spring 80 and carry the pointer or marker 75 downwardly to a point corresponding with the rate of flow through the orifice 20.

This construction affords therefore either an indication of the flow through orifice 20 or a record if the record sheet 76 is rotated by clockwork or other suitable means. The equilibrium is established when the compression of the spring 80 balances the difference in pressures on opposite sides of the orifice 20; and accordingly the apparatus may be calibrated by suitably adjusting the nut 78 to determine the compression of the spring 80.

It will be understood that, except where expressly stated in the appended claims, my invention is not limited to the employment of an orificed plate 18 for causing different pressures in the pipes 21 and 22, or 21ª and 22ª, for any other suitable means may be employed in lieu thereof, as for example, a Venturi tube, Pitot tubes, etc.

What I claim is:

1. In a system for proportioning one fluid with respect to another, the combination with means for restricting the flow of one of said fluids, of means for circulating the other of said fluids, means responsive to the effective pressure exerted upon said first named means for producing in said other of said fluids a pressure proportional to said first named effective pressure, comprising a piston to which said effective pressure is applied, a valve member, a seat therefor, and means connecting said piston with said valve member and adapted to transmit force from said piston to said valve member tending to move the same toward its seat, said circulating fluid impinging upon one side of said valve member and exerting thereon a pressure in opposition to said piston to move said valve member from its seat.

2. In a system for proportioning one fluid with respect to another, the combination with means for restricting the flow of one of said fluids, of means for circulating the other of said fluids, means responsive to the effective pressure exerted upon said first named means for producing in said other of said fluids a pressure proportional to said first named effective pressure, comprising a piston to which said effective pressure is applied, a valve member, a seat therefor, means connecting said piston with said valve member and adapted to transmit force to said valve member, said circulatory fluid impinging upon one side of said valve member and discharging past said valve member and exerting a pressure thereon in opposition to said piston to move said valve member from its seat, and means for balancing the force of gravity upon said piston and valve member.

3. In a system for proportioning one fluid with respect to another, the combination with means for producing a pressure dependent upon the rate of flow of one of the fluids, of means for circulating the other of said fluids, means for producing in said other of said fluids a pressure proportional to said first named pressure comprising a valve, a seat therefor, means transmitting to said valve a force dependent upon said first named pressure and tending to move said valve toward its seat, said circulating fluid impinging upon one side of said valve and exerting thereon a pressure in opposition to said last named means to move said valve from its seat, and a by-pass from the under side of said valve having its highest point slightly higher than said valve seat.

4. In a system for proportioning one fluid with respect to another, the combination with means for producing a pressure dependent upon the rate of flow of one of the fluids, of means for circulating the other of said fluids, means for producing in said other of said fluids a pressure proportional to said first named pressure comprising a valve, a seat therefor, means transmitting to said valve a force dependent upon said first named pressure and tending to move said valve toward its seat, said circulating fluid impinging upon one side of said valve and exerting thereon a pressure in opposition to said last named means to move said valve from its seat, a by-pass from the under side of said valve having its highest point slightly higher than said valve seat, and means restricting the flow of fluid in said by-pass located at substantially the highest point of said by-pass.

5. In a system for proportioning one fluid with respect to another, the combination with means for producing a pressure dependent upon the rate of flow of one of the fluids, of means for circulating the other of said fluids, means for producing in said other of said fluids a pressure proportional to said first named pressure comprising a valve, a seat therefor, means transmitting to said valve a force dependent upon said first named pressure and tending to move said valve toward its seat, said circulating fluid impinging upon one side of said valve and exerting thereon a pressure in opposition to said last named means to move said valve from its seat, a by-pass extending from the under side of said valve upwardly to a point slightly above said valve seat and then downwardly to a point below said valve seat, flow restricting means in said by-pass at substantially its highest point, and a vent between the inlet of said by-pass and said flow restricting means.

6. In a system for proportioning one fluid with respect to another, the combination with means for restricting the flow of one of said fluids, of a cylinder, a piston, a conduit from each end of said cylinder to the opposite sides respectively of said restricting means, a casing having three compartments, means for circulating the second of said fluids through the first of said compartments into a second of said compartments, said first and second compartments separated by a valve member, said second and third compartments being open to the atmosphere, a discharge opening for said second fluid from said second compartment, a by-pass for said second fluid from said first compartment, linking means connecting said piston with said valve member, and adjustable counterbalancing means for balancing the force of gravity upon said valve member, piston and linking means, comprising a rod extending into said third compartment from outside the casing, a spring connection between said rod and said casing, a spring connection between said rod and said linking means, a fulcrum for said rod, and a counterweight adjustable upon said rod.

7. In a system for proportioning one fluid with respect to another, the combination with means for restricting the flow of one of said fluids, means for circulating the other of said fluids, means responsive to the effective pressure exerted upon said first named means for producing in said other of said fluids a pressure proportional to said first named effective pressure comprising a valve connected with said second named means against which said other of said fluids impinges, said other of said fluids flowing against and past said valve and exerting thereon a pressure in opposition to said second named means to force said valve from its seat and means subjected to said second named pressure for restricting the flow of said other of said fluids.

8. In a system for proportioning one fluid with respect to another, the combination with means for restricting the flow of one of said fluids, means for circulating the other of said fluids, means responsive to the effective pressure exerted upon said first named means for producing in said other of said fluids a pressure proportional to said first named effective pressure, including a valve connected with said second named means, said other of said fluids impinging upon said valve and exerting thereon a pressure in opposition to said second named means to force said valve from its seat and an orificed plate subjected to said second named pressure for restricting the flow of said other of said fluids.

9. In a system for proportioning one fluid with respect to another, the combination with means for producing a pressure dependent upon the rate of flow of one of the fluids, of means for circulating the other of said fluids, means for producing in said other of said fluids a pressure proportional to said first named pressure comprising a valve, a seat therefor, means transmitting to said valve a force dependent upon said first named pressure and tending to move said valve toward its seat, said circulating fluid impinging upon one side of said valve and exerting thereon a pressure in opposition to said last named means to move said valve from its seat.

10. In a system for proportioning one fluid with respect to another, the combination with means for producing a pressure dependent upon the rate of flow of one of the fluids, of means for circulating the other of said fluids, means for producing in said other of said fluids a pressure proportional to said first named pressure comprising a valve, a seat therefor, means transmitting to said valve a force dependent upon said first named pressure and tending to move said valve toward its seat, said circulating fluid impinging upon one side of said valve and exerting thereon a pressure in opposition to said last named means to move said valve from its seat, and a restricted by-pass for diverting a portion of said second fluid, the pressure upon said by-pass being dependent upon the position of said valve.

11. In a system for proportioning one fluid with respect to another, the combination with means for producing a pressure dependent upon the rate of flow of one of the fluids, of means for circulating the other of said fluids, means for producing in said other of said fluids a pressure proportional to said first named pressure comprising a valve, a seat therefor, means transmitting to said valve a force dependent upon said first named pressure and tending to move said valve toward its seat, said circulating fluid impinging upon one side of said valve and exerting thereon a pressure in opposition to said last named means to move said valve from its seat, and means subjected to said second named pressure for restricting the flow of said other of said fluids.

12. In a system for proportioning one fluid with respect to another, the combination with means for producing a pressure dependent upon the rate of flow of one of the fluids, of means for circulating the other of said fluids, means for producing in said other of said fluids a pressure equal to said first named pressure comprising a valve, a seat therefor, means transmitting to said valve a force dependent upon said first named pressure and tending to move said valve toward its seat, said circulating fluid impinging upon one side of said valve and exerting thereon a pressure in opposition to said last named means to move said valve from its seat, and means subjected to said second named pressure for restricting the flow of said other of said fluids.

13. In a system for proportioning one fluid with respect to another, the combination with an orificed plate for restricting the flow of one of the fluids, means for circulating the other of said fluids, a valve, a seat therefor, said circulating fluid impinging upon said valve and exerting thereon a pressure tending to move the same away from its seat, and means for exerting on said valve an opposing pressure dependent upon the difference in the pressures on opposite sides of said plate and tending to move said valve toward said seat.

14. In a system for proportioning one fluid with respect to another, the combination with an orificed plate for restricting the flow of one of the fluids, means for circulating the other of said fluids, a valve, a seat therefor, said circulating fluid impinging upon said valve and exerting thereon a pressure tending to move the same away from its seat, means for exerting on said valve an opposing pressure dependent upon the difference in the pressures on opposite sides of said plate and tending to move said valve toward its seat, and a second orificed plate through which a portion of said circulating fluid is diverted.

15. In a system for proportioning one fluid with respect to another, the combination with means for restricting the flow of one of the fluids, a piston, means for transmitting the force at opposite sides of said restricting means to the opposite sides of said piston, respectively, a passage through which the other of said fluids is circulated, a by-pass from said passage, a valve controlling said passage connected with said piston, means for restricting the flow of the other of said fluids through said by-pass comprising an apertured plate in said by-pass, a downwardly extending discharge passage on the opposite side of said apertured plate, and an air vent at the upper end of said discharge passage.

16. In a system for proportioning one fluid with respect to another, the combination with means for restricting the flow of one of the fluids, a piston, means for transmitting the fluid pressure at opposite sides of said restricting means to the opposite sides of said piston, respectively, a main passage through which the other of said fluids is circulated, a valve controlling said passage connected with said piston, means for restricting the flow of the other of said fluids comprising a conduit having an upwardly extending passage communicating with said main passage, a chamber at the upper end of the upwardly extending passage having an inclined wall, an opening in said wall, an apertured plate held against said wall and over said opening, a downwardly extending discharge conduit communicating directly with said opening, and an air vent at the upper end of said last mentioned conduit.

17. In a system for proportioning one fluid with respect to another, the combination with means for restricting the flow of one of the fluids, a cylinder, a piston movable therein, fluid connections from opposite sides of said piston to opposite sides of said means, a passage through which the other of said fluids is circulated, a by-pass from said passage, means for restricting the flow of the other of said fluids through said by-pass, a valve member controlling said passage connected with said piston, and means for counterbalancing the weight of said valve member and piston, said valve member being normally raised from its seat by the pressure of said second fluid thereagainst.

18. In a system for proportioning one fluid with respect to another, the combination with means for restricting the flow of one of the fluids, a cylinder, a piston movable therein, fluid connections from opposite sides of said piston to opposite sides of said means, a passage through which the other of said fluids is circulated, a by-pass from said passage, means for restricting the flow of the other of said fluids through said by-pass, a valve member controlling said passage connected with said piston, a seat for said valve member and means for circulating the other of said fluids through said passage with substantially constant rate of flow, said valve member being raised from its seat by the pressure thereupon caused by the circulation of said second fluid, whereby said valve member is automatically adjusted to retard the passage of said second liquid by the proper amount to maintain the pressure in said passage proportional to the effective pressure upon said piston.

19. Means for proportioning one fluid with respect to another comprising the combination with differential pressure means responsive to the flow of one of said fluids, of means for circulating a second fluid, a valve connected with said differential pressure means, said second fluid exerting a pressure against and flowing past said valve whereby said valve is forced from its seat, the position of said valve being determined by said differential pressure means, and a restricted by-pass for said second fluid subjected to a pressure dependent upon the position of said valve.

In testimony whereof I have hereunto affixed my signature this 23rd day of March, 1916.

JOSEPH D. YODER.